March 10, 1964    R. F. GERISCH    3,124,236
SWITCH MEANS FOR CONVEYING AND SORTING APPARATUS
Filed Feb. 13, 1961    3 Sheets-Sheet 1
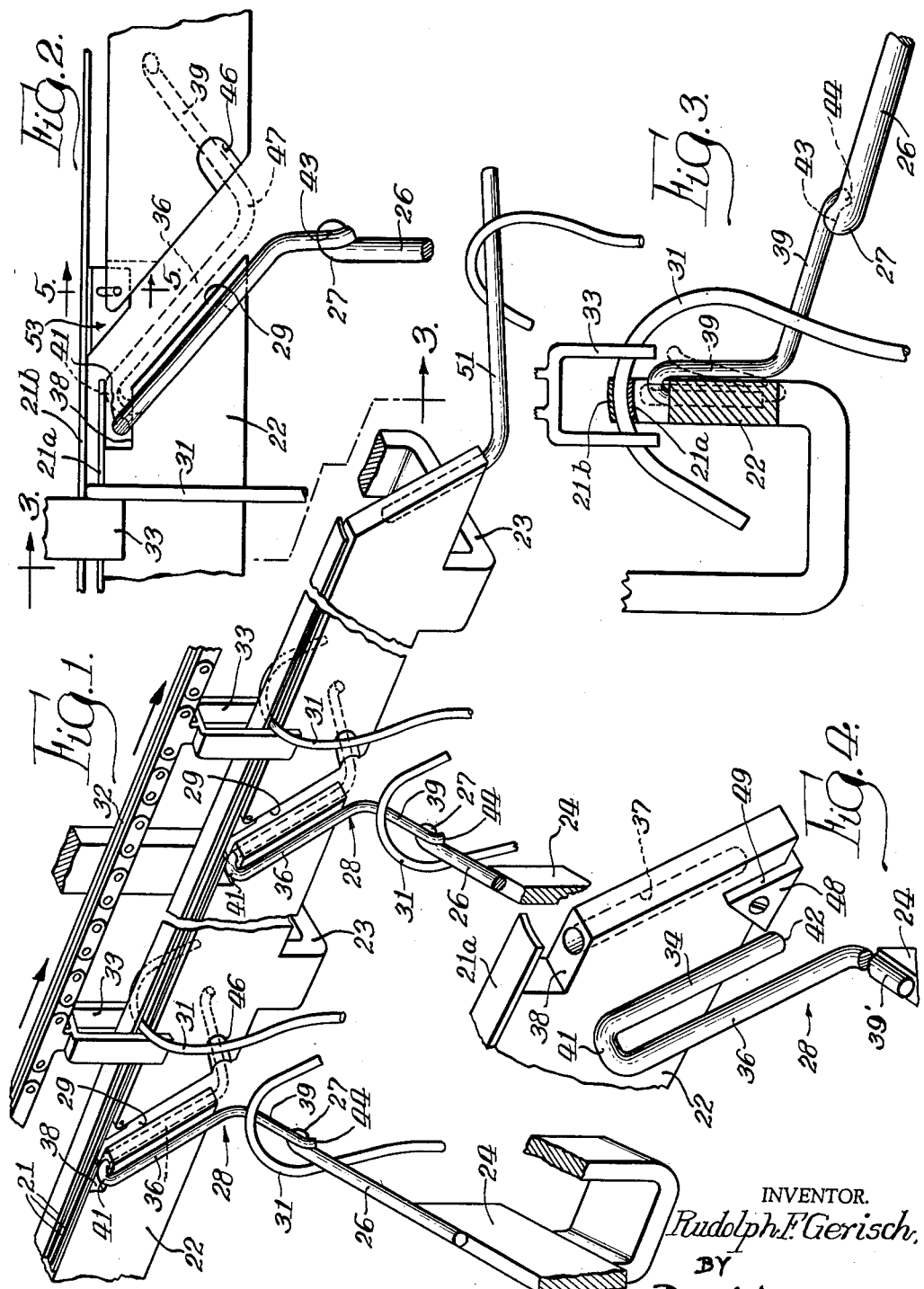
INVENTOR.
Rudolph F. Gerisch,
BY
Davis, Lindsey, Hibben & Noyes
Attys.

March 10, 1964 R. F. GERISCH 3,124,236
SWITCH MEANS FOR CONVEYING AND SORTING APPARATUS
Filed Feb. 13, 1961 3 Sheets-Sheet 2
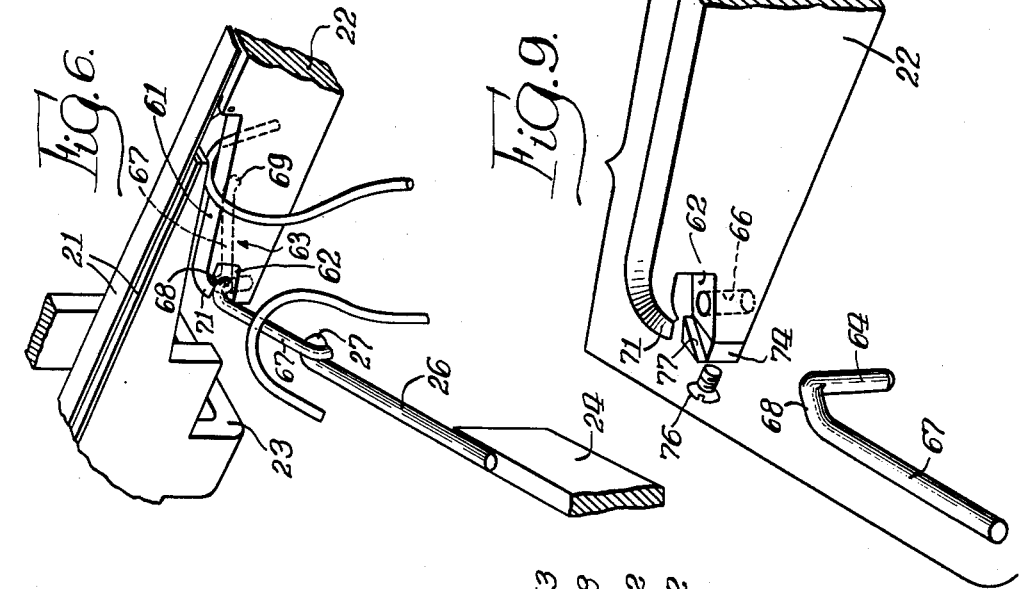
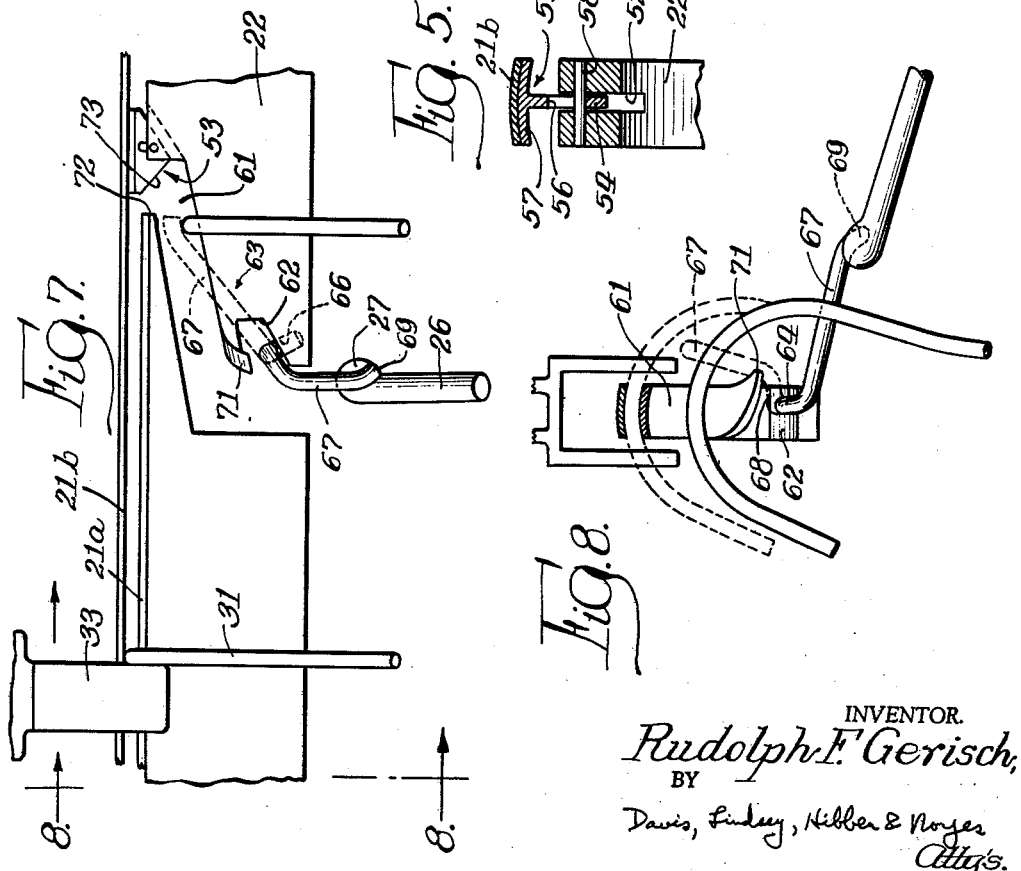
INVENTOR.
Rudolph F. Gerisch,
BY
Davis, Lindsey, Hibben & Noyes
Atty's.

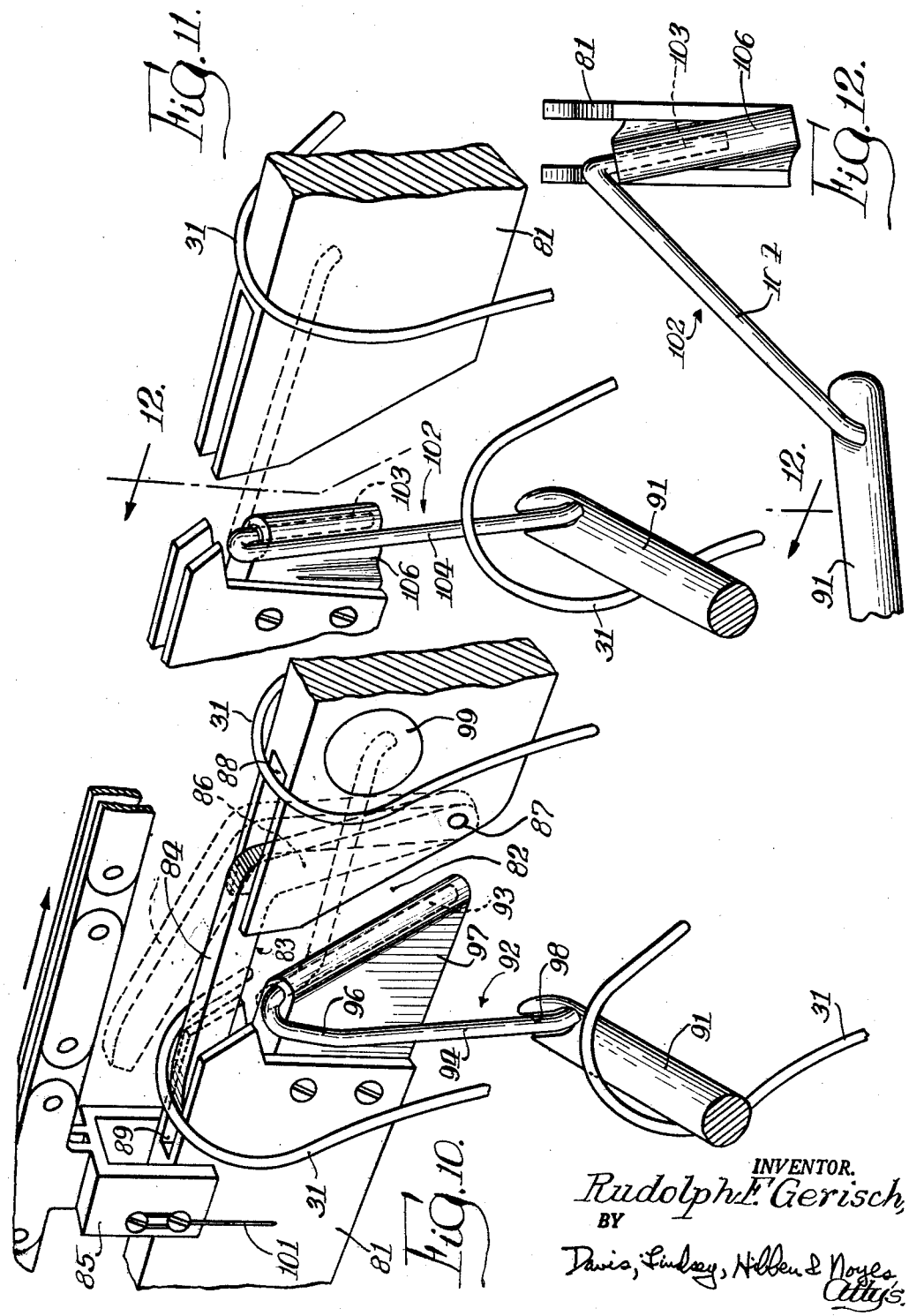

United States Patent Office 3,124,236
Patented Mar. 10, 1964

3,124,236
SWITCH MEANS FOR CONVEYING AND SORTING APPARATUS
Rudolph F. Gerisch, Westchester, Ill. (% R. F. Gerisch Co., 1545 Circle, Forest Park, Ill.)
Filed Feb. 13, 1961, Ser. No. 88,771
15 Claims. (Cl. 198—169)

This invention relates to improvements in apparatus for conveying and sorting articles, particularly articles adapted to be suspended by hooks or the like.

In dry cleaning plants it is customary to convey garments on hangers from one location in the plant to another, and numerous automatic conveyor schemes have been devised for this purpose. Similarly, in laundry establishments it is frequently necessary to convey bags of presorted laundry through various stages in the plant.

In my copending application Serial No. 626,260 filed December 4, 1956, now U.S. Patent No. 2,998,136 issued August 29, 1961, I have described and claimed a novel apparatus which makes it possible to convey articles in any desired sorted relation between a common loading point and any number of delivery points while maintaining a predetermined sorted relation of the articles at all times so that there is no possibility of error. Briefly described, this apparatus comprises an elongated rigid support having a main rail and a plurality of laterally extending branch rails, and a plurality of elongated deflectable elements such as thin metal strips or wires extending along and mounted on the rails in closely grouped relation. The elongated deflectable strips or wires define a plurality of segregated trackways extending between a common loading station at one end of the main rail and a plurality of individual delivery stations at the remote ends of the branch rails. The hook portions of the article carriers, for example conventional wire coat hangers, are interposed between selected strips or wires at the loading station and are moved therealong to the selected delivery stations by means of suitable conveyor or pusher means.

The present invention relates to a novel and improved switch means for use with a conveying-sorting system having a main run and one or more branch runs, including particularly a system of the type disclosed in my abovementioned copending application. As will hereafter appear, it is quite important for maximum utility of the system that the branch runs leading from the main run to the delivery stations be disposed at either side of the main run, as circumstances may require or permit, and not merely at the side of the main run corresponding to the open side of the hanger or hook.

Moreover, it is also desirable in the processing of articles suspended from hangers that the hangers be deliverable onto the branch runs with the open portions of the hooks facing either to the right or to the left, as may be desired.

Accordingly, a primary object of the invention is to provide a novel and improved means, in a conveying and sorting system of the class described, for transferring articles from a main run or rail to a branch run or rail.

A further object of the invention is to provide a conveying and sorting system for articles suspended from hooks or the like having improved flexibility of operation so as to accommodate varying operational requirements.

Another object of the invention is to provide an improved conveying and sorting system for hook-suspended articles wherein the articles may be delivered to branch runs or rails at either side of a main run or rail and with the open portions of the hooks facing in either direction, as desired.

Other objects and advantages of the invention will be apparent from the subsequent detailed description taken in conjunction with the accompanying drawings, wherein:

FIG. 1 is a fragmentary perspective view of a conveying and sorting system illustrating one specific embodiment of the invention;

FIG. 2 is a side elevational view of a portion of the system shown in FIG. 1;

FIG. 3 is a transverse sectional view taken along the line 3—3 of FIG. 2;

FIG. 4 is a fragmentary perspective view on an enlarged scale showing certain structural details and also illustrating a modification of the invention;

FIG. 5 is an enlarged transverse sectional view taken along the line 5—5 of FIG. 2 and showing a further detail of structure;

FIG. 6 is a fragmentary perspective view illustrating another specific embodiment of the invention;

FIG. 7 is a side elevational view of the embodiment shown in FIG. 6;

FIG. 8 is a transverse sectional view taken along the line 8—8 of FIG. 7;

FIG. 9 is a fragmentary perspective view illustrating a further modification of the invention;

FIG. 10 is a fragmentary perspective view illustrating still another specific embodiment of the invention;

FIG. 11 is a fragmentary perspective view illustrating still another specific embodiment of the invention; and FIG. 12 is an end elevational view as seen substantially along the line 12—12 of FIG. 11.

Referring first to FIGS. 1 to 5, the invention is illustrated in connection with a conveying-sorting system of the type disclosed in my aforementioned copending application Serial No. 626,260 and which might be used in a dry cleaning plant. However, it is to be understood that the principles of the invention will find application in many diverse industrial fields. The system includes a plurality of elongated relatively thin flexible strips 21 of metal or other suitable material which extend from a loading station (not shown). The strips 21 are supported in superimposed, vertically stacked, contiguous relation on an elongated main rail 22 which is suspended from a ceiling or other superstructure by suitably spaced brackets 23. At selected intervals along the main rail 22 laterally extending branch rails 24 are provided which communicate with individual delivery stations (not shown) corresponding to the desired sorted groups. Although for simplicity the branch rails 24 are shown extending from only one side of the main rail 22, it is an important advantage of the present invention that the branch rails 24 can be arranged at either and/or both sides of the main rail 22, as desired, thereby greatly increasing the number of delivery stations for a given length of main rail.

As clearly shown in FIG. 1, each branch rail 24 is provided with an extension in the form of a rod 26 rigidly affixed to the rail 24 and having a terminus 27 spaced outwardly from the main rail 22. This space between the side of the main rail and the terminus of the branch rail is normally bridged by a movable switch element designated generally at 28 and described below in detail. The main rail 22 is formed with an inclined gap 29 adjacent each branch rail 24 to permit drop-off of a hook from the main rail 22 to the branch rail 24 via the switch 28 when the latter is in closed position, as also described below. In the system illustrated, including the stacked strips 21, the hook portions 31 of a plurality of conventional wire coat hangers are adapted to be interposed between adjacent strips. Garments may be suspended from the hangers in the usual manner for transportation along the system but for convenience the hangers will be referred to hereinafter merely as hooks since the exact nature of the articles suspended from the hooks is immaterial.

As described in detail in my copending application Serial No. 626,260, the strips 21 must have a certain degree of flexibility to permit temporary local deflection or spreading apart of adjacent strips during insertion and sliding passage of the hooks therebetween. For effecting movement of the hooks 31 along the main rail 22 a suitable endless conveyor is employed comprising a chain or belt 32 mounted above the main rail 22 and moving in the direction indicated by the arrows in FIG. 1. In this instance the chain 32 carries a plurality of bifurcated members or U-shaped pusher forks 33 which straddle the stacked strips 21 and engage the hooks 31 to effect sliding movement of the latter.

The switch 28 comprises a unitary length of substantially rigid wire or rod-like material having a U-shaped end portion with spaced legs 34 and 36, as best seen in FIG. 4. The outermost leg 34 of the U comprises a pivot portion loosely journaled for rotary swinging movement in a slightly enlarged inclined bore 37 provided in the main rail 22 closely adjacent the upstream side of the gap 29. A notch or recess 38 is provided in the upper edge of the rail 22 at the inlet of the gap 29 to accommodate the U-shaped end of the switch. In this instance the gap 29 inclines downwardly in the same general direction of movement of the hooks 31 along the main rail 22, and the bore 37 is parallel to the gap 29. The leg 36 of the U extends closely adjacent the outside of the rail 22 parallel to the leg 34 and connects with a laterally extending bridging portion or arm 39. The angle between the arm 39 and the leg 36 may vary from somewhat less than 90° to slightly more than 90° dependent upon the angular orientation of the branch rail 24 with respect to the main rail 22. In the illustrated embodiment this angle is slightly greater than 90° so that the bridging arm portion 39 slopes downwardly toward the extension 26 when the switch is closed (FIG. 3) thereby facilitating rapid drop-off of the hooks onto the branch rail 24. To insure free rotary movement of the pivot leg 34 in the bore 37, the length of the leg 34 is slightly greater than the depth of the bore 37 so that the bight portion, designated at 41, of the U is spaced above the notch 38. In addition, the lower end of the pivot leg 34 is preferably rounded, as at 42 (FIG. 4), so as to provide an effective bearing surface against the flat bottom of the bore 37 with minimum frictional resistance.

As a result of the U-shaped configuration at the pivotally supported end of the switch 28, it will be seen that the bridging arm 39 of the switch is offset or off-center relative to the pivot axis of the switch. This offset relationship in conjunction with the inclination of the pivot axis causes the switch to assume, by the action of gravity, a normally closed position (as shown in solid lines) wherein the bridging arm 39 spans the space between the main rail 22 and the extension 26 of the branch rail 24. To facilitate accurate alignment of the switch with the branch rail and to limit the extent of movement of the switch, the terminus 27 of the extension 26 may be formed with a small complementary groove 43 (FIG. 2), the tip end of the bridging arm 39 being bent downwardly to a slight extent, as at 44, to insure smooth sliding passage of a hook over the junction and to "lock" the switch in closed position.

Thus, when the switch 28 is in its gravity-actuated normally closed position, it will be seen that a hook 31 moving along the main rail 22 between the lowermost strip 21a and the next adjacent strip 21b (FIG. 2) is in position to be transferred from the main rail 22 to the corresponding branch rail 24. Although in the illustrated embodiment of the invention the hooks 31 are moved by the pusher forks 33, it will be understood that the hooks could also be moved manually or by other mechanisms. Referring particularly to FIGS. 1 and 2, as a hook 31 approaches the inclined gap 29, it will be seen that the strip 21a terminates at the gap 29 so that the hook 31 must necessarily enter the inlet of the gap at the upper edge of the rail 22. To avoid entry of the hook into the notch 38, the end of the strip 21a extends far enough to overlie the bight portion 41 of the switch. As the hook passes beyond the end of the strip 21a, it drops onto the inclined surface of the gap 29 and slides downwardly by gravity to the bottom or outlet end of the gap at the lower edge of the rail 22. The leg 36 of the switch is positioned closely adjacent the side of the rail 22 thereby avoiding any interference with free passage of the closed side of the hook 31. In the embodiment shown in FIGS. 1–3 the open side of the hook 31 faces away from the branch rail 24 while the hook is still on the main rail 22. However, when the hook 31 reaches the bottom of the gap 29 the leg 36 causes the hook to slide laterally onto the outwardly extending bridging arm 39 of the switch thereby clearing the lower edge of the rail 22 with the open portion of the hook facing generally to the right. The momentum of the hook at this point insures sliding passage thereof across the downwardly sloping bridging arm 39 of the switch onto the extension 26 and the branch rail 24. At this point the hook is transferred along the branch rail 24 to the delivery station (not shown) either manually or by supplementary conveyor driven pushers (not shown) or even by gravity if the branch rail 24 is mounted at a suitable inclination.

In the case of a hook which is moving along the main rail 22 for discharge at a subsequent branch rail 24, e.g. a hook supported on the strip 21b in FIG. 2, the switch 28 is freely swingable to an upper open position to accommodate continued passage of the hook along the main rail to the next discharge point. Thus, as seen in FIG. 1, a hook 31 on the main rail 22 has been moved across the left-hand gap 29 by the pusher fork 33, and the closed side of the hook has engaged the bridging arm 39 of the switch thereby swinging or lifting the switch angularly and upwardly about its pivot axis to the dotted line position shown in the drawing. As will be apparent from FIG. 3 in particular, in the open position of the switch the bridging arm 39 closely hugs the side of the main rail 22 so that there is adequate clearance for passage of the hook through the space between the main rail 22 and the terminus 27 of the branch rail extension. To facilitate close juxtaposition of the switch arm 39 against the side of the main rail 22, a groove 46 is preferably provided in the side of the rail at the lower end of the gap 29. To further facilitate this close fit of the open switch against the main rail, the bore 37 is preferably located closer to the switch side of the main rail 22 (as shown in FIG. 3) rather than in the center of the thickness of the rail.

After the hook 31 moves far enough along the rail 22 to clear the open switch, the switch automatically falls by gravity to its normally closed or bridging position. However, in the case of a hook 31 moving at relatively high speed along the main rail, the positive lifting action of the hook on the pivotally mounted switch causes the switch portion 39 to impact against the side of the rail 22 with a vigorous slapping action so that the hook will frequently rebound from the rail to seated position on the branch rail extension 26, thereby supplementing the normal gravity closing effect. If for some reason a switch 28 should stick in its open or raised position, it will be seen that a hook moving along strip 21a in FIG. 2 would drop onto the inclined leg 36 of the open switch and slide downwardly through the gap 29. However, even when the switch 28 is in its open position, the leg 36 will be offset slightly relative to the pivot leg 34 so that the momentum and weight of the loaded hanger will cause the stuck switch to break free and swing to its lowermost closed or bridging position.

FIG. 4, in addition to showing details of the switch mounting already described, also shows a modification of the means for limiting the swinging movement of the switch. In the form shown in FIGS. 1 to 3, the branch rail extension 26 has the groove 43 which coacts with the bridging arm 39 and its down-turned end portion 44 to provide positive seating engagement and also to prevent the switch from overrunning the extension 26 during movement of the switch to closed position. However, in place of this previously described arrangement, the groove 43 and the bent tip 44 may be dispensed with and a stop block 48 (FIG. 4) having an inclined stop surface 49 is secured to the lower edge of the main rail 22 adjacent the lower or outlet end of the gap 29. In this case when the switch is in normally closed bridging position the leg 36 will rest on the sloping surface 49 of the stop block thereby limiting the extent of pivotal movement of the switch and at the same time holding the bridging arm 39 in properly aligned relation with the branch rail 24. In this case also the branch rail extension 26 of the previously described structure may be omitted and the outer end of the bridging portion of the switch is straight, as at 39′ in FIG. 4, and is disposed in alignment over the upper edge of the branch rail 24. The arrangement of FIG. 4 is particularly useful in the case of relatively lightweight hangers and articles where positive seating of the switch is not as essential. In fact, in the variation shown in FIG. 4, the stop block 48 may be so arranged that when the switch is in closed position the straight end 39′ of the bridging arm is spaced or suspended slightly above the upper edge of the branch rail 24.

In the embodiment of the invention illustrated in FIGS. 1 to 4 it should also be noted that the entire switch element 28 is readily removable from the bore 37 merely by bending the end of the overlying strip 21a out of the way, thereby facilitating easy repair and replacement of the switches.

As previously pointed out, an important advantage of the invention resides in the fact that the branch rails may be arranged in laterally extending relation at either or both sides of the main rail 22 so as to increase the number of available delivery stations for a given length of main rail. For example, at the extreme right end of the main rail 22 in FIG. 1 a branch rail or take-off bar 51 is shown rigidly secured adjacent a gap in the rail and extending in the opposite direction from the main rail, as compared with the branch rails 24, in order to accommodate discharge of hooks at the side of the main rail corresponding to the open sides of the hooks. It will be readily apparent that other branch rails 51 could be provided at suitable locations along the main rail so that together with the switches 28 and branch rails 24 discharge of hooks can be effected at both sides of the main rail. On any given side of the main rail, the branch rails may be spaced as closely or as frequently as desired dependent upon the speed of the conveyor 32 and the spacing between the forks 33.

FIG. 5 illustrates a structural detail showing one manner in which a strip 21 may be movably fastened to the main rail 22 at the downstream side of a gap 29. The upper corner of the rail 22 at the gap 29 has a vertical slot 52, and a mounting piece 53, generally T-shaped in cross section, has its depending leg portion 54 loosely fitted in the slot 52. The depending leg portion 54 of the T also has a vertical slot 56. The cross bar 57 of the T is secured to the underside of the strip 21b. A cross pin 58 is mounted in the rail 22 extending across the slot 52 and through the slot 56 in the mounting piece 53. Sliding movement of the hook between a pair of adjacent strips 21 causes temporary local deflection or lifting of all strips disposed above the hook, and the fastening arrangement shown in FIG. 5 is provided to accommodate this lifting action at the various inclined gaps or takeoff points in the mail rail. Thus, in FIG. 2 a hook 31 is approaching the gap 29 in the main rail 22, and the strip 21b directly above the hook 31 has been lifted upwardly to accommodate passage of the hook, the pin and slot fastening arrangement permiting limited upward movement of the strip 21b and its attached mounting piece 53.

In FIGS. 6 to 9 a different embodiment of the invention is shown for the purpose of permitting discharge of a hanger or hook with the open portion of the hook facing to the left or in reverse direction compared to FIG. 1. Portions of the structure which are essentially the same as in the previously described embodiment have been given the same reference numerals. In this case the main rail 22 has an inclined gap 61 which is slanted from the top to the bottom of the rail 22 in a direction generally opposite to the direction of movement of the hooks along the main rail. In other words, the drop-off gap 61 is slanted reversely as compared with the gaps 29 in FIG. 1. At the lower end of the inclined gap portion 61 a notch or recess 62 is provided in the rail 22 to accommodate pivotal mounting of a movable switch designated generally at 63. The switch element 63 in this form has a down-turned pivot portion 64 at one end which is rotatably received in an inclined bore 66 extending into the rail 22 from the lower surface of the recess 62 in the same general manner as in the first-described embodiment. The axis of the bore 66 is disposed in a generally opposite inclination to the inclination of the gap 61, but the angle between the pivot axis of the bore 66 and the vertical is somewhat less in this instance than the angle of inclination of the pivot axis in the first-described embodiment of the invention. The switch 63 also has a laterally extending bridging arm 67 which is connected to the upper end of the pivot portion 64 by an angular offset bend portion 68. Thus, the bridging arm 67 is always in offset or off-center relation to the pivot axis of the switch so as to achieve gravity closing of the switch in the same general manner as in the first described embodiment.

As shown in FIGS. 6 to 8, the outer tip of the bridging arm 67 is turned downwardly, as at 69, for cooperation with a grooved terminus 27 in the end of the branch rail extension 26, as previously described. The portion of the rail structure 22 in the gap 61 which overlies the recess 62 is formed with an outwardly curved converging tip 71 which serves several functions. First of all, the tip 71 overlies the upper end of the switch portions 64 and 68 so as to guide the hooks 31 over the notch or recess 62 during sliding passage of the hooks from the gap 61 onto the switch. In addition, the outwardly curved tip 71 assists the hooks 31 in traversing the relatively sharp angular turn from the main rail 22 onto the branch rail 24. Furthermore, the overlying tip 71 retains the switch 63 against unintentional displacement or removal from the bore 66.

In the operation of this embodiment of the invention, a hook 31 moving along the main rail 22 between the strips 21a and 21b drops into a slot 72 (FIG. 7) at the upper edge of the main rail 22, the lower strip 21a terminating at the edge of this slot. The upper strip 21b has been displaced upwardly during the passage of the hook 31, and a movable fastening means 53 is provided for the strip 21b in the manner previously described. As the hook 31 drops through the slot 72 into the upper end of the inclined gap 61 it then slides downwardly in a generally reverse direction along the gap 61 as compared to its original direction of movement along the main rail 22. In the event that the hook 31 was originally moving along the rail 22 at a fairly high rate of speed, it will rebound from the angular edge, designated at 73, of the fastening device 53 so as to positively divert the hook into the gap 61. As the hook 31 slides downwardly through the gap 61 it is diverted outwardly by the bent tip portion 71 onto the bridging arm 67 of the switch and thence onto the branch rail extension 26 and the branch rail 24, thereby delivering the hook with its open portion facing to the left as seen in the drawings.

As in the previously described embodiment, the switch 63 is freely pivotable to open position by lifting engagement with a hook 31 which is being transported along the main rail 22 beyond the gap 61 to a subsequent branch rail. The angular offset 63 in the switch 63 insures positioning of the outer end portion 69 of the bridging arm closely adjacent the side of the rail 22 so as to provide adequate clearance for passage of the hook 31 along the main rail. Once the hook 31 has passed beyond the raised open switch 63, the switch will thereafter return by gravity to closed position for the reasons already pointed out. Moreover, if for some reason the switch 63 should stick in open position, the hook 31 will always slide underneath the outer end of the arm 67 and by engagement therewith will positively force the switch to closed or bridging position. Inasmuch as the hook 31 undergoes a rather sudden reversal in direction of movement after dropping from the upper edge of the main rail 22 into the inclined gap 61, it will be understood that the reverse swing of the article suspended on the hanger will assist in the sliding passage of the hook onto the switch 63 and the communicating branch rail.

To remove the switch 63 for replacement or repair, it is necessary to force the bridging arm 67 beyond its normally seated position on the branch rail extension 26 so as to clear the curved tip 71 of the rail and allow the pivot portion 64 to be lifted from the bore 66. Moreover, in the forms shown in FIGS. 6 to 8, seating of the outer edge of the bridging arm 67 in the grooved terminus 27 is relied upon to limit the extent of pivotal movement of the switch during closing thereof. However, in FIG. 9 a modification is shown wherein a stop block 74 is detachably secured, as by a screw 76, at the outlet of the gap 61 and is provided with a sloping shoulder or abutment surface 77 against which the angular portion 68 of the switch may bear to limit its downward swinging movement. In this instance, the outer tip of the bridging arm 67 has a straight configuration and no groove is necessary in the cooperating branch rail since the shoulder 77 accurately positions the switch in aligned relation with the branch rail. As previously mentioned in connection with FIG. 4, the FIG. 9 modification also has particular utility in the handling of relatively lightweight hooks and articles, and the bridging arm 67 may in fact be disposed in slightly spaced relation above the branch rail 24. The stop block 74 is detachable in order to permit removal of the entire switch element from its bore 66 for replacement or repair purposes.

FIG. 10 illustrates a further embodiment of the invention which provides additional operating advantages. In this instance the invention is shown in connection with a somewhat different type of conveying system having a main rail 81 but without the superimposed strips for segregating the hanger hooks 31 for delivery at predetermined stations as in the previously described embodiments. Instead, each discharge gap 82 in the rail 81 is provided with a normally closed switch 83 having a bridging portion 84 and a mounting portion 86, the latter being pivoted at 87 in an endwise slot 88 in the rail 81 at one side of the gap 82 and the outer end of the bridging portion 84 being receivable in a similar end slot 89 in the rail 81 at the opposite side of the gap 82. Discharge of a selected hook 31 is accomplished by pivotal movement of the switch 83 through actuating means (not shown) which forms no part of the present invention. With the bridging portion 84 in elevated or open position, as shown in dotted lines, a hook 31 being moved along the rail 81 by a conveyor fork 85 in the direction of the arrow will be discharged downwardly into the inclined gap 82 for delivery to a branch rail 91.

A switch 92 is provided for cooperation between the rails 81 and 91, the switch comprising a downturned pivot portion 93, a laterally extending bridging portion 94, and an angular bend 96 integrally interconnecting the portions 93 and 94 in offset relation. The pivot portion 93 is rotatably received in an inclined bore provided in a pivot block 97 secured in the slot 89 of the main rail 81.

By reason of the inclined pivot axis and the offset relation between the switch portions 93 and 94, it will be understood that the switch 92 is normally gravity-urged to closed position, as shown in full lines, with the tip of the bridging portion 94 received in a groove 98 in the branch rail 91. However, the switch 92 may be raised to open position, as shown in dotted lines, in the same general manner as previously described in order to permit the passage of a hook across the closed main rail switch 83 to a subsequent delivery station. When the switch 92 is open, the bend 96 allows the bridging portion 94 to be positioned closely adjacent the side of the main rail.

In the FIG. 10 form of the invention, the lateral projection of the switch portions 96–94 from the upper end of the pivot portion 93 allows the branch rail 91 to be positioned at a higher elevation than is the case in the embodiment shown in FIGS. 1–5, thereby affording more clearance and working space beneath the main rail. Moreover, during movement of the switch from closed to open position by the action of a passing hook, the switch portion 94 is engaged by the outermost curved part of the hook 31 at a point of maximum spacing from the pivot axis of the switch whereby to obtain more effective leverage resulting in smoother opening action and a lesser degree of shock on impact, especially at high speeds. The receiving groove 98 in the end of the branch rail 91 is also enlarged in FIG. 10 to provide more clearance for seating engagement of the switch portion 94 in the groove. The rod or wire material forming the switch 92 although substantially rigid will have a certain degree of spring or resiliency and the switch is mounted so that in the initial closing action the tip of the switch portion 94 may come to rest lightly on the branch rail 91 at the edge of the groove 98. Thereafter, as the hook 31 slides downwardly onto the switch portion 94, the weight of the hook and the article carried thereon will cause the tip of the resilient switch arm to snap into fully seated position in the groove 98, thereby minimizing the necessity for exact adjustment or alignment of the switch relative to the grooved end of the branch rail.

FIG. 10 also illustrates a further modification of the invention to permit movement of hooks 31 in either direction along the rail 81. In some instances it will be desirable to reverse the operation of the conveyor forks temporarily, e.g. to retrieve a defective or unfinished garment or other article. Obviously, this is not possible if the switch 92 is in closed position. Therefore, to permit such reverse operation of the conveyor system, a permanent magnet element 99 is mounted or embedded in the side of the main rail 81 in a location to engage and hold the outermost end of the switch portion 94 when the latter is in raised or open position. Thus, the normal gravity actuation of the pivotal switch to closed position is overcome and the switch is magnetically retained in open position so as to permit passage of the closed or solid side of the hook 31 in either direction along the rail 81. However, when the main rail switch 83 is open to discharge a hook 31 into the gap 82, the weight of the hook and the article carried thereby will be imposed directly on the portion 96 of the switch which is offset relative to the pivot axis and the magnetic contact will thereby be disrupted allowing the switch to swing to closed position and carrying the hook 31 with it. Almost immediately thereafter, the closed switch is returned to magnetically retained open position by means of a depending finger or wire element 101 secured to the moving conveyor fork 85. The finger 101 engages the switch portion 96 during passage of the conveyor fork 85 and the switch is swung upwardly until the outer end of the switch arm is engaged and secured by the magnet 99.

FIGS. 11 and 12 show a further modification of the switch as applied to a main rail 81 of the same type shown in FIG. 10, the rail switch 83 being omitted for convenience. In this instance the switch, designated at 102, is substantially L-shaped and comprises a pivot portion 103 and a bridging portion 104 disposed at substantially 90°. To obtain the desired gravity actuation for insuring normally closed position of the switch, the pivot portion 103 is rotatably received in a bore in a twisted or skewed pivot block 106 mounted in the rail 81 at the upstream side of the gap 82. In the previously described embodiments of the invention the inclined pivot axis of the switch is in the plane of the main rail, but in the embodiment of FIGS. 11–12 the pivot block 106 is so twisted (FIG. 12) that the pivot axis for the pivot portion 103 is disposed at an angle relative to the plane of the rail 81, the upper end of the pivot axis being titled laterally in the direction of the branch rail 91 whereby to provide for gravity-actuated closure of the switch even though the latter has only a 90° bend.

It will be readily understood that in any of the embodiments of the invention the angular inclination of the drop-off gaps in the main rail, the exact angular configuration and degree of offset of the switches, and the inclination of the pivot axis may be varied as required to achieve faster or slower transfer of the hooks from the main rail to the various branch rails dependent upon the type and speed of the means employed for effecting bodily movement of the hooks along the main rail.

Although the invention has been described with particular reference to certain specific structural embodiments thereof, it is to be understood that various modifications and equivalents may be resorted to without departing from the scope of the invention as defined in the appended claims.

I claim:

1. In a conveying and sorting system in which article-suspending hooks or the like are transferred from a main rail to a laterally extending branch rail spaced from said main rail and having means at the main rail for permitting passage of a hook along the main rail beyond the branch rail, the combination with said rails of a switch movable between a lower bridging position and an upper raised position, and means pivotally supporting said switch at said main rail for gravity actuation of the switch to said bridging position so as to span the space between said main rail and said branch rail for transferring a hook from the main rail to the branch rail, said switch being freely swingable to said raised position by contact with means moving along said main rail beyond said branch rail.

2. In a conveying and sorting system for articles suspended from hooks or the like, the combination of a main rail, a branch rail extending laterally from said main rail, said branch rail having a terminus disposed outwardly from said main rail to provide a space therebetween, means at said rail permitting passage of a hook through said space and along said main rail beyond said branch rail, a switch movable between a lower closed position bridging said space and an upper open position clearing said space, and means pivotally supporting said switch on an inclined pivot axis such that said switch is gravity urged toward said closed position but is freely swingable to open position.

3. In a conveying and sorting system for articles suspended from hooks or the like, the combination of a main rail, a laterally extending branch rail disposed in spaced relation from said main rail, means at said main rail permitting passage of a hook along said main rail beyond said branch rail, and a switch element movably supported on said main rail, said switch element having a pivot portion supported on said main rail for free swinging movement about an inclined pivot axis and a bridging portion adapted to bridge the space between said main rail and said branch rail, said bridging portion being offset from said pivot axis whereby said switch element is urged by gravity into a lower bridging position for sliding movement of a hook from said main rail onto said branch rail but is swingable into raised position by engagement with means moving along said main rail beyond said branch rail.

4. The structure of claim 3 further characterized in that said switch element comprises a unitary length of substantially rigid material having a downwardly bent section at one end thereof providing said pivot portion, an outwardly extending section at the other end thereof providing said bridging portion, and an intermediate offset section, and said main rail is provided with an inclined bore receiving said pivot portion in freely rotatable relation therein.

5. In a conveying and sorting system for articles suspended from hooks or the like, the combination of an elongated main rail having an inclined gap therein, a laterally extending branch rail having a terminus spaced outwardly from said main rail adjacent said gap, means at said main rail for bridging said gap to permit passage of a hook along said main rail across said gap and beyond said branch rail, and a gravity actuated switch for bridging the space between said rails whereby to allow passage of a hook from said main rail through said gap onto said switch and thence onto said branch rail, said switch being freely swingable to open position by contact with means moving along the main rail across said gap.

6. The structure of claim 5 further characterized in that said main rail is disposed generally horizontally with said inclined gap having an inlet at the top of the rail and an outlet at the bottom of the rail, and said branch rail and switch, when the latter is in bridging position, being disposed adjacent said outlet.

7. In a conveying and sorting system for articles suspended from hooks or the like, the combination of an elongated main rail having an inclined gap therein, a laterally extending branch rail having a terminus spaced outwardly from said main rail adjacent said gap, means at said main rail for bridging said gap to permit passage of a hook along said main rail across said gap and beyond said branch rail, and a switch element having a pivot portion supported on said main rail adjacent said gap for free swinging movement about an inclined pivot axis and a bridging portion adapted to bridge the space between said main rail and said terminus of said branch rail, said bridging portion being offset from said pivot axis whereby said switch element is urged by gravity into bridging position to allow passage of a hook from said main rail through said gap onto said bridging portion of said switch element and thence onto said branch rail, and said switch element also being freely swingable by engagement of means moving along said main rail with said bridging portion to raise said switch element to open position with said bridging portion disposed closely alongside said main rail whereby to provide clearance for passage of a hook along said main rail across said gap and through the space between said main rail and said terminus of said branch rail.

8. In a conveying and sorting system for articles suspended from hooks or the like, the combination of a main rail, a laterally extending branch rail spaced from said main rail, said main rail having an inclined drop-off to permit discharge of hooks from said main rail to said branch rail, means at said main rail for bridging said drop-off to permit passage of a hook along said main rail across said drop-off and beyond said branch rail, said main rail also having an inclined bore adjacent said drop-off, and a switch element having an end pivot portion loosely received in said bore for free swinging movement between an open position and a gravity actuated closed position bridging the space between said rails, and guard means overlying the pivot portion of said switch element for retaining the same in said bore and for guiding the passage of hooks from said main rail onto said switch element during transfer of hooks to said branch rail.

9. In a conveying and sorting system for articles suspended from hooks or the like, the combination of a main rail adapted to have hooks moved therealong in a given direction, said main rail having a drop-off inclined downwardly in the general direction of movement of the hooks, a laterally extending branch rail having a terminus spaced outwardly from the lower end of said drop-off, means at said main rail for bridging said drop-off to permit passage of a hook along said main rail across said drop-off and beyond said branch rail, and a movable switch element having a pivot portion swingably supported on said main rail adjacent said drop-off and on a pivot axis inclined in the same general direction as said drop-off, said switch element also having an outwardly extending bridging portion adapted to bridge the space between said main rail and said branch rail and said bridging portion being in offset relation to said pivot axis whereby said switch element is gravity actuated into bridging position to allow passage of a hook from said main rail along said drop-off onto said bridging portion of said switch element and thence onto said branch rail, said switch element being freely movable to open position by engagement of means moving along said main rail with said bridging portion so as to swing said bridging portion angularly and upwardly in the general direction of movement of the hook thereby allowing passage of a hook along said main rail across said drop-off and through the space between said main rail and said branch rail.

10. The structure of claim 9 further characterized in that said switch element has a generally U-shaped portion at one end thereof, one leg of the U-shaped portion being rotatably received in an inclined bore in said main rail adjacent said drop-off and the other leg of the U-shaped portion extending closely adjacent the side of said main rail with said bridging portion extending outwardly from said other leg.

11. In a conveying and sorting system for articles suspended from hooks or the like, the combination of a main rail adapted to have hooks moved therealong in a given direction, said main rail having a drop-off inclined downwardly in a direction generally opposite to the direction of movement of the hooks, a laterally extending branch rail having a terminus spaced outwardly from the lower end of said drop-off, means at said main rail for bridging said drop-off to permit passage of a hook along said main rail across said drop-off and beyond said branch rail, and a movable switch element having a pivot portion swingably supported on said main rail adjacent said drop-off and on a pivot axis inclined in a generally opposite direction to the inclination of said drop-off, said switch element also having an outwardly extending bridging portion adapted to bridge the space between said main rail and said branch rail and said bridging portion being in offset relation to said pivot axis whereby said switch element is gravity actuated into bridging position to allow passage of a hook along said main rail in said given direction into said drop-off thence reversely along said inclined drop-off onto said bridging portion and thence onto said branch rail, said switch element being freely movable to open position by engagement of means moving along said main rail with said bridging portion so as to swing said bridging portion angularly and upwardly in the general direction of movement of the hook along said main rail thereby allowing passage of a hook along said main rail aross said drop-off and through the space between said main rail and said branch rail.

12. The structure of claim 11 further characterized in that said switch element has a downturned pivot portion at one end rotatably received in an inclined bore in said main rail adjacent said drop-off, said bridging portion extending outwardly from said downturned pivot portion and being connected thereto by an angular offset portion.

13. In a conveying and sorting system for articles suspended from hooks or the like, the combination of a main rail, a laterally extending branch rail spaced from said main rail, said main rail having a drop-off for discharging hooks from the main rail to the branch rail, means at said main rail for bridging said drop-off to permit passage of a hook along said main rail across said drop-off and beyond said branch rail, an angular switch having a pivot portion and a bridging portion adapted to bridge the space between said rails, and means pivotally supporting said pivot portion of said switch at said drop-off on a generally upright but inclined pivot axis, the upper end of said pivot axis being displaced outwardly from said main rail in the direction of said branch rail whereby said switch is gravity actuated toward closed position bridging the space between said rails but is freely swingable to open position by engagement with means moving along said main rail.

14. The combination of claim 1 further characterized by the provision of retaining means on said main rail for releasably holding said switch in said raised position, said switch being releasable for swinging movement to said bridging position in response to movement of a hook from the main rail onto said switch.

15. The combination of claim 14 further characterized in that said retaining means comprises magnetic means.

References Cited in the file of this patent
UNITED STATES PATENTS

| | | |
|---|---|---|
| 644,217 | Jencke et al. | Dec. 18, 1900 |
| 1,296,989 | McKeeken | Mar. 11, 1919 |
| 1,361,624 | Schmidt | Dec. 7, 1920 |
| 2,946,427 | Friedman | July 26, 1960 |
| 2,998,136 | Gerisch | Aug. 29, 1961 |